(«United States Patent» [19]   [11] Patent Number: 4,862,308
Udren   [45] Date of Patent: Aug. 29, 1989

[54] POWER BUS FAULT DETECTION AND PROTECTION SYSTEM

[75] Inventor: Eric A. Udren, Coral Springs, Fla.

[73] Assignee: Electric Power Research Institute, Inc., Palo Alto, Calif.

[21] Appl. No.: 44,647

[22] Filed: May 1, 1987

[51] Int. Cl.[4] .............................................. H07H 3/08
[52] U.S. Cl. ...................................... 361/45; 361/87; 361/95; 361/97
[58] Field of Search ....................... 361/45, 47, 49, 87, 361/93, 95, 97

[56] References Cited

U.S. PATENT DOCUMENTS

| | | | |
|---|---|---|---|
| 4,315,295 | 2/1982 | Zocholl | 361/97 X |
| 4,550,360 | 10/1985 | Dougherty | 361/93 |
| 4,571,659 | 2/1986 | Demayer et al. | 361/97 X |
| 4,703,389 | 10/1987 | Scott | 361/93 |

Primary Examiner—Derek S. Jennings
Attorney, Agent, or Firm—Flehr, Hohbach, Test, Albritton & Herbert

[57] ABSTRACT

A power bus fault detector for detecting faults in a predefined portion of an electrical power bus having at least one phase. Power feed lines are coupled to the predefined portion of the power bus by circuit breakers. Current transformers are used to detect the current flowing through each phase of each power feed line which is coupled to the predefined portion of the power bus. A summer generates a current differential signal for each phase that is equal to the sum of the currents detected by the current transformers. A fault detector generates a trip signal which causes the feed line circuit breakers to disconnect the feed lines from the power bus when a fault is detected in the predefined poriton of the power bus. The fault detector includes a detector which detects when the current differential signal in any of the power bus's phases is substantially nonsinusoidal in shape. In a preferred embodiment, the fault detector detects when, for any of the phases, the percentage of time that the magnitude of the current differential signal exceeds a fault cutoff value is greater than the percentage of time that the current differential value exceeds the fault cutoff value for a known minimum fault.

22 Claims, 6 Drawing Sheets

POWER BUS FAULT DETECTION AND PROTECTION SYSTEM

The present invention relates generally to electrical power transmission systems, and particularly to systems for detecting faults on an electrical power bus.

BACKGROUND OF THE INVENTION

Electrical power transmission systems which distribute power from a number of different power sources typically use power buses to connect the elements of an electric power network to the network's nodes. In any such system, faults, or short circuits, can occur and it is important to isolate the portion of the system in which the fault is occurring so that the power distribution system can continue to operate in spite of the failure of one portion of the system, and so that the rest of the system is not damaged.

Faults generally cause a portion of the power bus to be grounded or to suffer leakage between phases. These faults are generally detected by measuring the imbalance, if any, between the amount of current entering and the amount of current leaving a specified portion of the power bus.

The object of the present invention is to provide an improved system and method for determining if a fault is occurring within a specified zone of a power bus.

The primary problem addressed by the present invention is distinguishing between faults which occur within a specified zone of a power bus and faults which occur outside the specified bus zone.

FIG. 1 shows the basic setup used both in the prior art and in the present invention for detecting faults in a power bus. This Figure shows one phase of a three phase power bus 20, with a specified bus protection zone 22. The power bus protection zone 22 receives and distributes power through feed lines F1 to FN. As shown in this particular example, all the feed lines except FN are used to receive power from remote power generators (not shown in FIG. 1), and feed line FN is used to transmit the power from these remote sources to the rest of the power network. In any case, all the current which enters and leaves the power bus protection zone 22 should, if there are no faults, flow through these feed lines F1 to FN.

The protection zone 22 is bounded by current transformers CT1 to CTN on the feed lines F1 to FN. Therefore points 36 and 38 shown in FIG. 1 are within the protection zone 22, while point 39 is outside the protection zone. Were a fault to occur at point 36 or 38, the fault would be an internal fault (i.e., within the bus protection zone 22), while a fault at point 39 would be an external fault.

Internal faults are detected by measuring the net current (generally called the differential current) $I_{dif}$ flowing into the bus protection zone 22. To do this, a current transformer CTx is used on each phase of each feed line Fx to develop a current signal (called the secondary current) proportional to the current flowing through that phase of that feed line into the bus protection zone 22. In most applications, these current signals are summed simply by attaching all the current transformers for each phase in parallel with an current measuring device 24. The current measuring device 24 generates an output indicator—typically a voltage signal proportional to the differential current $I_{dif}$.

In other applications, the current signal from each current transformer can be individually measured by a current based analog to digital converter, and the resulting digital signals can be summed and otherwise processed by a standard digital computer.

A fault detector 30, which can be an electronic circuit or a programmed digital computer, analyzes the differential current signal $I_{dif}$ to determine if there is a fault in the bus protection zone 22. When the fault detector 30 detects an internal fault it generates a trip signal on trip line 32.

Each feed line Fx is coupled to the power bus 20 by a circuit breaker CBx which disconnects the feed line from the power bus 20 if fault detector 30 detects an internal fault and generates a trip signal on trip line 32.

In theory, if there are no faults in the bus protection zone, the differential current $I_{dif}$ should be equal to zero. On the other hand, if there are faults in the bus protection zone 22, such as at point 36 or 38, the amount of current entering the bus protection zone 22 will not be equal to the current leaving it, and a nonzero $I_{dif}$ will be generated.

Therefore it would appear to one not experienced in the design of power buses that if $I_{dif}$ remains nonzero for even a small period of time then there must be a fault in the bus protection zone.

The problem with this method of fault detection is that an external fault, such as a fault at point 39, can cause the iron core of the current transformer nearest the fault, or even other ones of the current transformers, to saturate. When a current transformer saturates, the signal on its secondary is no longer proportional to the current flowing through its primary coil, and thus a differential current $I_{dif}$ will be developed in the secondary circuit even though the fault is outside the protection zone.

A number of different solutions to this problem (i.e., the current transformer saturation caused by external faults) have been used in prior art systems. Historically, the solution longest in use is the use of a percentage-differential relay. The percentage-differential relay compares the differential current $I_{dif}$ with a restraint signal that is based on the sum of the magnitudes of currents flowing in all of the feed lines. For instance, the relay might require that the differential current exceed five percent of the total current flowing into the power bus to trip the bus's circuit breakers. The percentage-differential relay has the disadvantages that it requires measurement or computation of the individual feed line currents for comparison to the differential current, that low-current internal faults may be masked and therefore not detected, and that heavy external faults can also produce inadequate restraint signals to block tripping (e.g., if the adjacent current transformer saturates very badly).

Another prior art technique is the use of a high impedance relay. This technique makes use of the fact that when a current transformer saturates, the secondary exciting impedance of the transformer is reduced. The current transformers on the bus's feed lines are coupled in parallel across a varistor burden with a voltage measuring element. If a current transformer saturates, the varistor burden forces false differential current through the saturated transformer (which has a reduced impedance). This prevents the varistor voltage from becoming large enough to rise above a preselected trip level. While this technique is effective, it requires current transformers which are physically wired together, and the signals generated by current transformers cannot be used for other purposes. Also, dangerous voltages may develop on the current transformer's secondary wiring during internal faults.

A third prior art technique is to use a feed line current sensor which cannot saturate. The primary example of this technique is the use of a linear coupler relay. In this relay, the secondaries of special air-core current transformers, which cannot saturate and which generate a voltage proportional to the current in the transformer's primary, are connected in series with a simple voltage-sensing element. The liner coupler relay is simple, fast and effective, but the linear couplers are also expensive and not useable for other current measurement purposes.

Referring to FIGS. 2A and 2B, the present invention is based on the observation that the differential current $I_{dif}$ is generally sinusoidal in shape for internal faults and substantially nonsinusoidal in shape, if present at all, for external faults. In FIG. 2A the solid line waveform is the secondary current $I_S$ of an unsaturated current transformer, while the dashed waveform is the secondary current $I_S$ of a saturated current transformer. As indicated, while a saturated current transformer does not track the primary (sinusoidal) current very well, it does recover and reproduce the primary current wave for at least a small portion of each cycle. FIG. 2B shows the differential current waveform $I_{dif}$ generated by the setup in FIG. 1 when an external fault occurs at 39 and one of the current transformers CTx is saturated as shown in FIG. 2A.

A related observation is that the differential current $I_{dif}$ is nonzero a much greater percentage of the time for internal faults than for external faults. In particular, the present invention solves the problem of distinguishing internal faults from external faults by looking at the percentage of time that the differential current is nonzero (actually, the amount of time that it is above a fault threshold value). For instance, looking at FIG. 2B, it is clear that a sinusoidal waveform is nonzero a much greater percentage of the time than the differential current waveform shown in FIG. 2B for a system with a saturated current transformer. The advantages of this approach are that it permits the use of standard current transformers, it is simple to implement, and permits the signals from the current transformers to be used for other measurement functions.

It is therefore a primary object of the present invention to provide an improved technique for distinguishing between faults inside a defined bus protection zone and faults outside that zone.

Another object of the present invention is to provide a technique for detecting internal power bus faults by determining whether the net current entering the power bus exceeds a fault threshold at least a specified percentage of the time.

SUMMARY OF THE INVENTION

In summary, the present invention is a power bus fault detector for detecting faults in a predefined portion of an electrical power bus having at least one phase. Power feed lines are coupled to the predefined portion of the power bus by controllable connectors. Current transformers are used to detect the current flowing through each phase of each power feed line which is coupled to the predefined portion of the power bus. A summer generates a current differential signal for each phase that is equal to the sum of the currents detected by the current transformers. A fault detector generates a trip signal which causes the feed line connectors to disconnect the feed lines from the power bus when a fault is detected in the predefined portion of the power bus. The fault detector includes means for detecting when, for any of the power bus's phases, the current differential signal is substantially nonsinusoidal in shape.

In a preferred embodiment, the fault detector includes means for detecting when, for any of the phases, the percentage of time that the magnitude of the current differential signal exceeds a fault cutoff value is greater than the percentage of time that the current differential value exceeds the fault cutoff value for a known minimum fault.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
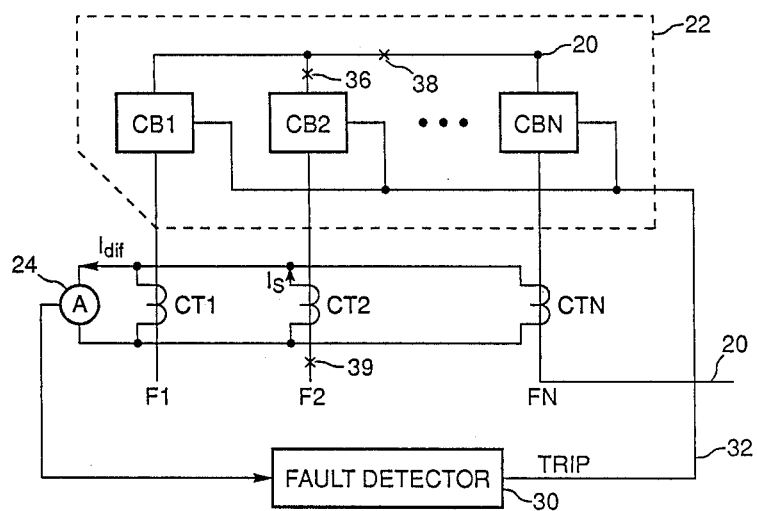
FIG. 1 schematically depicts the basic setup used in many power bus protection systems.
Figure 2A:
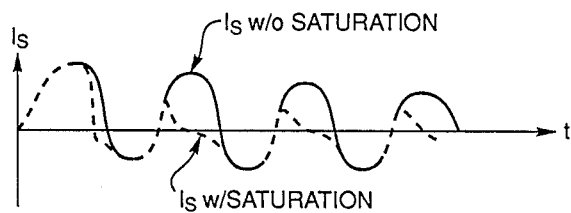
FIGS. 2A-B depict the effect of saturation on a current transformer.
Figure 2B:
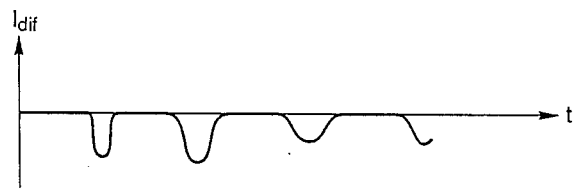

FIGS. 1 and 2A-B have already been described above. The first preferred embodiment uses the setup shown in FIG. 1.

Figure 3:
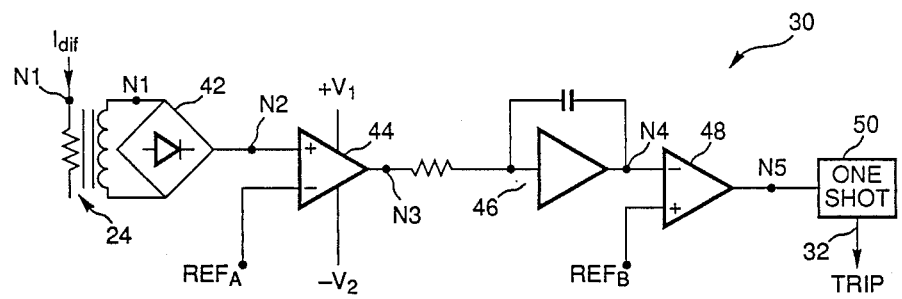
FIG. 3 depicts a first embodiment of the fault detector of the present invention.
Figure 4A:
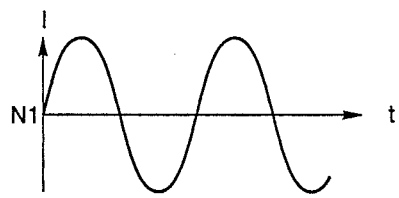
FIGS. 4A-F are timing diagrams showing the operation of the fault detector shown in FIG. 3.
Figure 4B:
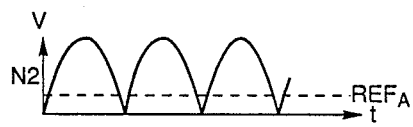

Referring to FIGS. 3 and 4A, there is shown an analog circuit embodiment of the present invention, and waveforms representing the operation of this circuit when an internal bus fault occurs. The fault detector 30 receives a voltage signal on node N1 from current measuring device 24 which is proportion in amplitude to the differential current $I_{dif}$. In this example of an internal bus fault, the shape of the differential current signal $I_{dif}$ if is generally sinusoidal.

The voltage signal on node N1 is passed through a bridge rectifier 42, and the resulting waveform on node N2 is compared by comparator 44 with a fault cutoff voltage $Ref_A$. Comparator 44 has a pull up voltage V1 which is much less than its pull down voltage $-V2$. For reasons explained below, in the preferred embodiment, the ratio of V2 to V1 is approximately fifteen.

Figure 4C:
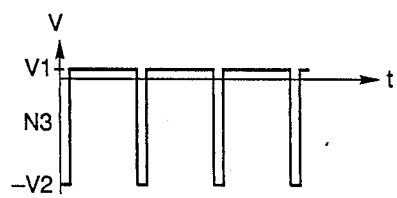

As shown in FIG. 4C, the output of the comparator is a rectangular waveform that is equal to V1 when the magnitude of the voltage of node N2 is greater than $Ref_A$, and V2 otherwise. Since the differential waveform is greater than $Ref_A$ most of the time, the N3 waveform is equal to V1 most of the time.

Figure 4D:
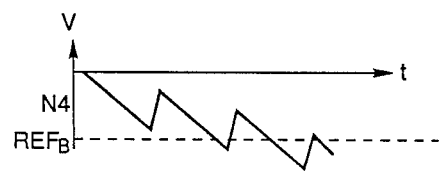
Figure 4E:
Figure 4F:

The output voltage of comparator 44 is integrated by integrator 46. As shown in FIG. 4D, the output of the integrator on node N4 ramps down at a rate proportional to V1, and ramps up at a rate proportional to V2, depending on the voltage on node N3.

In the preferred embodiment, V1 and $Ref_B$ are selected so that the time that it takes the integrator output on node N4 to fall from its starting point to $Ref_B$ is one half of a normal power cycle. Therefore, if the differential current $I_{dif}$ continuously exceeds $Ref_A$ for a half power cycle, a trip signal will be generated. Otherwise, it will take the fault detector two half power cycles to detect an internal fault and generate a trip signal.

The output of the integrator on node N4 is compared with a trip limit, $Ref_B$, by comparator 48. When the integrator's output falls below this trip limit, the comparator's output goes from zero to a positive voltage, which causes a one shot 50 to generate a long pulse on trip line 32. The pulse on trip line 32 is a trip signal which will cause the feed line circuit breakers CBx to disconnect the feed lines from the power bus 20.

In the preferred embodiment, the ratio of V2 to V1 has been set equal to about fifteen because the inventor has found that even a badly saturated current transformer will still track the primary current waveform fairly well at least one sixteenth of each cycle. Thus the integrator 46 should reset to its baseline output voltage during each power cycle as long as there are no internal faults. On the other hand, an internal power bus fault will generate a sinusoidally shaped differential current which is nonzero most of the time.

It is generally preferable to select a nonzero $Ref_A$ so that small differential current signals, which can be caused by a number of conditions other than bus faults, do not trip the circuit breakers on the feed lines. As will be clear to those skilled in the art, the selection of the fault cutoff reference $Ref_A$ will affect the selection of the V2 to V1 ratio, because even a true internal fault will generate a differential current signal which is much less than its peak value for much of each power cycle. The selection of the V2 to V1 ratio will also depend on how badly the worst conceivable external fault could saturate one of the current transformers CTx. In order to reliably distinguish between internal and external faults, the V2 to V1 ratio will generally have to be at least equal to four to one—meaning that external faults will generate differential currents less than the fault cutoff value at least 20 percent (i.e., V1/(V1+V2)) of each power cycle.

The lowest potentially useful V2 to V1 ratio is approximately two to one, using a relatively large $Ref_A$ voltage. Such a low ratio is useful only in fairly benign applications. Using a large $Ref_A$ will make the detector have low sensitivity to internal faults and will not mask large external faults which badly saturate one or more current transformers. Similarly, the largest normally useful V2 to V1 ratio is approximately 20, because larger ratios would require very low $Ref_A$ values—which will make the circuit overly sensitive to ratio errors (in the current transformers) that are not indicative of an internal fault.

The portion of each cycle that the differential current must remain below $Ref_A$ during each cycle in order to avoid tripping the circuit breakers CBx is called the zero window period.

Figure 5A:
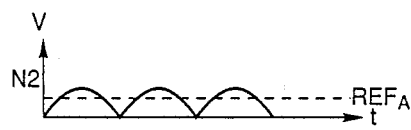
FIGS. 5A-C, 6A-C, 7A-C and 8A-C show the operation of the fault detector shown in FIG. 3 under different operating conditions.
Figure 5B:
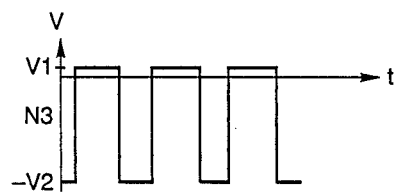
Figure 5C:
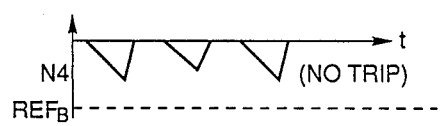

FIGS. 5A-C show the signal waveforms for a differential current which is too small to be interpreted as an internal value. While the differential current signal does exceed the fault cutoff value during each power cycle, it does so only a small percentage of the time, and thus is not indicative of an internal fault. Therefore no trip signal is generated.

Figure 6A:
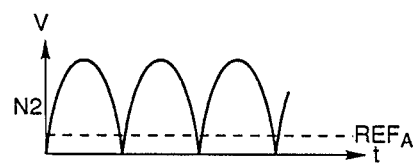
Figure 6B:
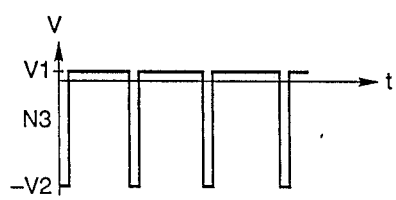
Figure 6C:
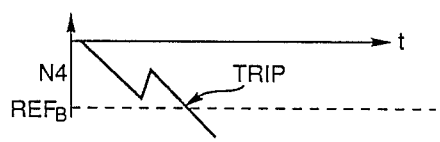

FIGS. 6A-C show the signal waveforms for a large differential current which is clearly the result of an internal power bus fault. The differential signal falls below the fault cutoff for only a small percentage of each half cycle, and the integrated signal on node N4 falls below the trip threshold during the second half cycle after the onset of the internal fault. A trip signal will be generated during the second half cycle, as shown in FIG. 6C.

Figure 7A:
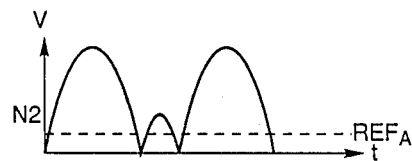
Figure 7B:
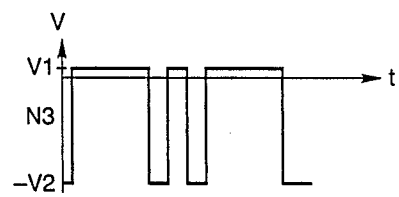
Figure 7C:
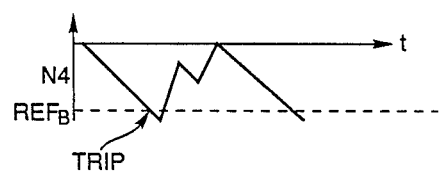

FIGS. 7A-C show the signal waveforms for an offset internal fault. The base of the first half cycle is considerably wider than the 8.33 milliseconds of a normal 60 hertz cycle, and therefore the circuit generates a trip signal during the first offset half cycle. Note that the current magnitude needed for generating a trip signal is less for offset faults than for an uncorrupted wave. This characteristic of the present invention, however, is desirable because it properly discriminates between external faults and internal faults using time domain properties of the differential current signal.

Figure 8A:
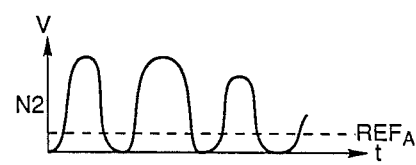
Figure 8B:
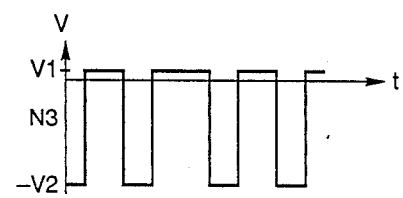
Figure 8C:
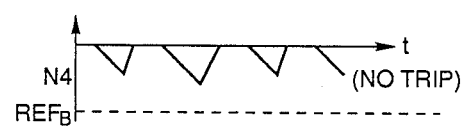

FIGS. 8A-C show how the first preferred embodiment responds to an external fault during which the current transformer saturated by the external fault recovers and reproduces the primary current wave for at least a small portion of each power cycle.

Figure 9:
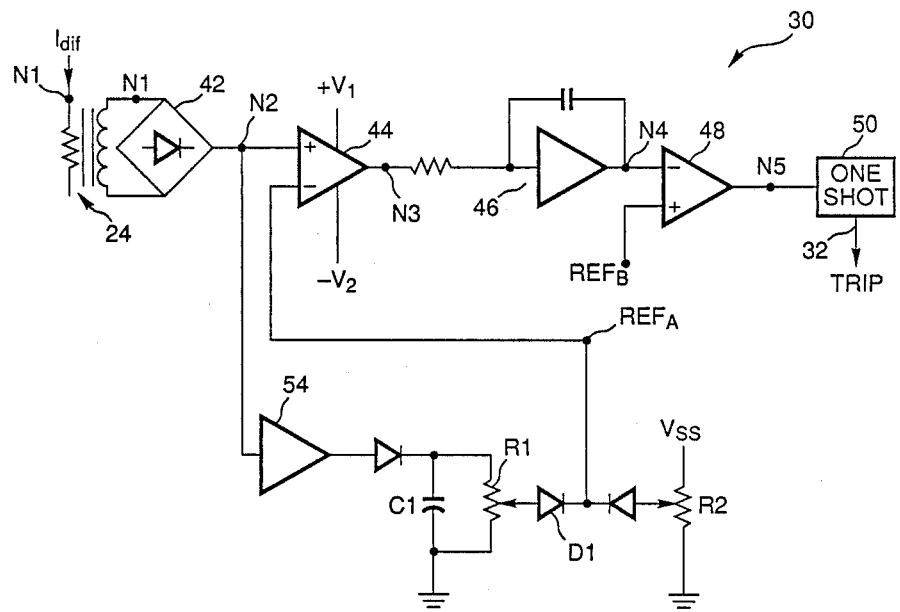
FIG. 9 depicts a fault detector with a self adjusting cutoff voltage.

In FIG. 9, the fault detector 30 shown in FIG. 3 is improved by the addition of a self adjusting cutoff voltage. The fixed fault cutoff reference is replaced by an adaptive threshold which is higher for heavy differential currents than for small ones.

A capacitor C1 is charged according to the peak magnitude of the differential current signal on node N2 by amplifier 54. This capacitor C1 is discharged through a resistor R1 relatively slowly so that it can follow the peak magnitude of the differential current signal up or down (i.e., the R1-C1 time constant is greater than 0.0166 seconds).

The $Ref_A$ voltage is generated by connecting the $Ref_A$ node to two voltage source nodes through two separate diodes D1 and D2. The first voltage source is picked up from resistor R1, which is a potentiometer in the preferred embodiment, so that a selected percentage of the capacitor C1 voltage is used. The second voltage source is a fixed baseline voltage obtained from a second potentiometer R2. The value of $Ref_A$ is the larger of these two voltages.

For small or moderate differential current magnitudes, the fixed threshold sets the fault cutoff value and the circuit works as described above. For heavy internal faults, use of an appropriate R1 potentiometer setting (about 0.1 times the C1 voltage in the preferred embodiment) allows the circuit to issue a trip output in spite of the raised threshold. For a heavy external fault with a badly saturated current transformer, the increased threshold will block tripping even if the ratio error (i.e., the amount by which the secondary current of the current transformer doesn't track the primary current) remains significant during the full power cycle. It is required only that the false differential current fall below the R1 portion of the peak differential current value (e.g., 0.1 times the peak differential current value) for more than the zero window period of each power cycle.

Digital Computer Embodiment

Figure 10:
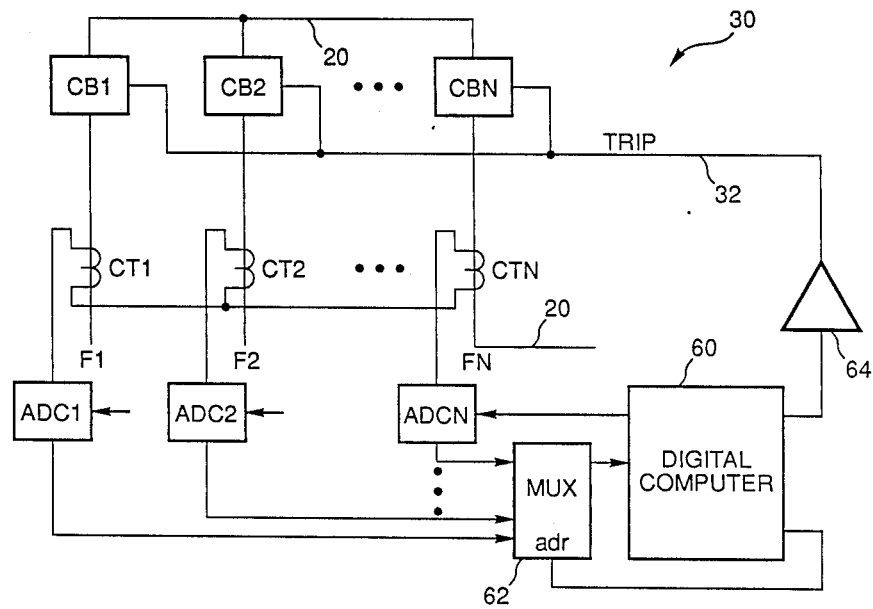
FIG. 10 depicts an embodiment of the present invention using a digital computer to detect internal power bus faults.

FIG. 10 depicts an embodiment of the present invention using a digital computer to detect internal power bus faults. In this embodiment, the secondary currents generated by the current transformers are individually converted to digital values by an analog to digital converters ADC1 to ADCN. The ADC's sample the secondary currents simultaneously under the control of a clocking signal from a computer 60. Then the computer 60 uses a multiplexer 62 to read in the secondary current values to generate a differential current signal value. These current values are summed and processed by the computer 60 in the same way as described above. If an internal bus fault is detected, then a trip signal is generated on line 32 by using an amplifier 64 to amplifying a digital trip signal generated by the computer 60.

Note that the same labels (such as N4, $Ref_A$, $Ref_B$, V1 and V2) are used in this embodiment as in the analog embodiment.

Figure 11:
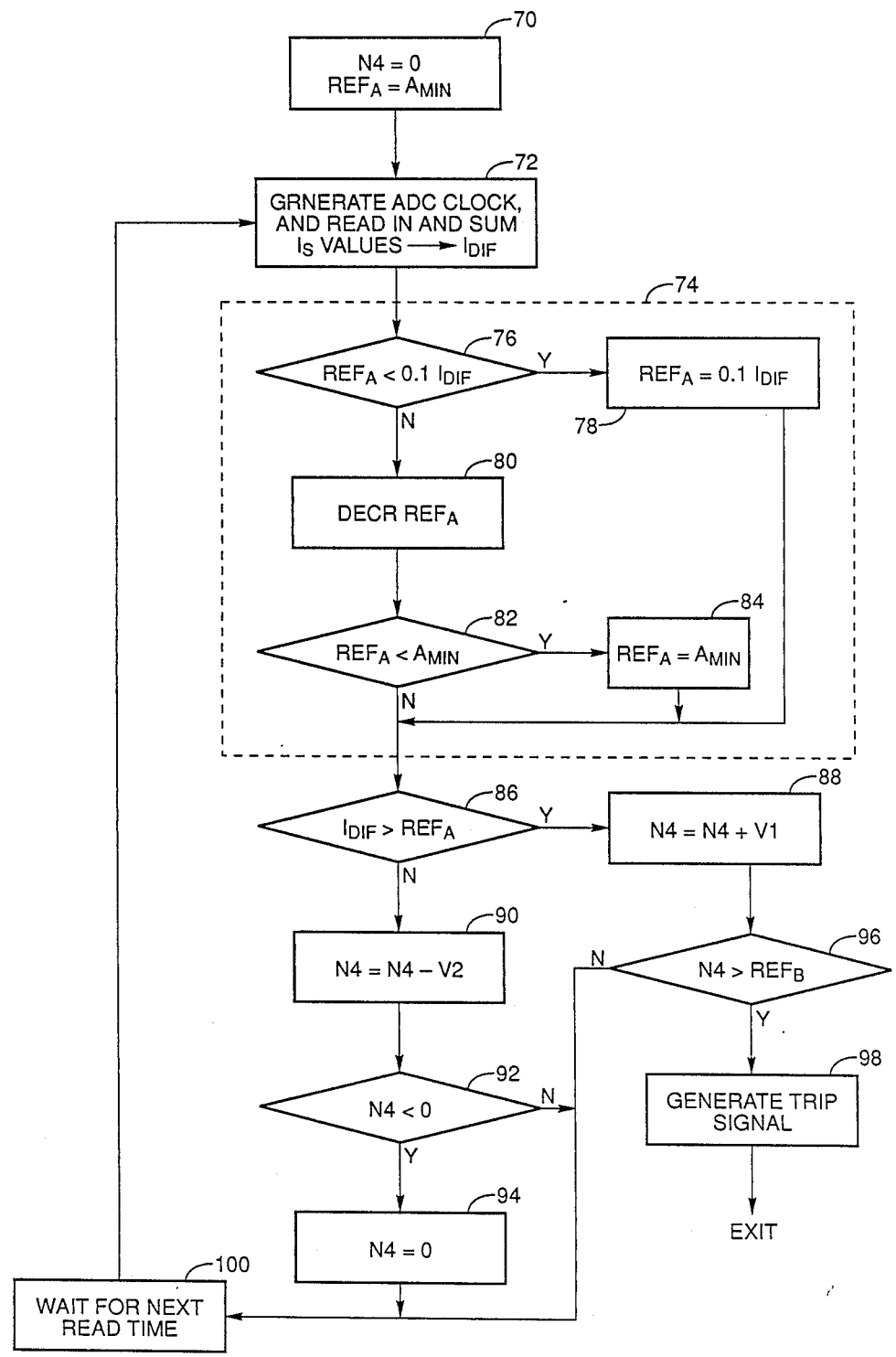
FIG. 11 depicts a flow chart of the process employed by the embodiment of the present invention shown in FIG. 10.

FIG. 11 depicts a flow chart of the process employed by the embodiment of the present invention shown in FIG. 10. When the computer 60 is turned on or the process is restarted, accumulator N4 and reference $Ref_A$ are initialized to zero and Amin (the minimum $Ref_A$ value), respectively (box 70).

In the preferred embodiment, the computer samples the differential current value sixteen times per power cycle. The sampling is performed by generating an ADC clock signal which causes all the ADC's to simultaneously sample and convert the secondary currents of the current transformers CT1 to CTN. After each sample is taken, the computer reads in the digitized current values through multiplexer 62 in standard fashion and generates an $I_{dif}$ value by summing these current values (box 72).

Next (box 74) the fault cutoff $Ref_A$ is adjusted. First the current value of $Ref_A$ is compared with a preselected percentage (e.g., ten percent) of the current $I_{dif}$ value (box 76). If $Ref_A$ is less than this value, $Ref_A$ is reset to equal this value—thereby tracking the peak differential current value (box 78).

If $Ref_A$ is not less than this value, then $Ref_A$ is decreased by either a fixed increment or by a fixed percentage (box 80). In the preferred embodiment $Ref_A$ is decreased by a fixed percentage—which, in fact, is a parameter that is selected by the user, and is typically equal to five percent. Then $Ref_A$ is checked to see if it is less than Amin (box 82). If so, $Ref_A$ is set to Amin (box 84)—which is the minimum allowed $Ref_A$ value. $Ref_A$ is prevented from being decreased below Amin to keep the relay from becoming too sensitive to small ratio errors—such as when the current flowing through the bus zone increases suddenly after a light or zero load condition.

Once $Ref_A$ has been adjusted, the differential current $I_{dif}$ is compared with $Ref_A$ (box 86). If $I_{dif}$ is greater than $Ref_A$ then accumulator N4 is increased by an amount corresponding to V1 (box 88); otherwise it is decreased by an amount corresponding to V2 (box 90), but not below zero (boxes 92 and 94).

If N4 is increased by V1, N4 is tested to see if it is larger than $Ref_B$ (box 96). If so, a trip signal is generated (box 98) and the routine exits.

If a trip signal is not generated, then the computer waits (box 100) until the next read time (which occurs 16 times during each power cycle in the preferred embodiment—i.e., about once every 1.04 milliseconds).

In summary, the digital computer embodiment performs the same functions as the analog version. However, it is clearly easier to modify and experiment with the digital version since changes in the technique can be made simply by changing the computer's software. The computer software can also make additional uses of the secondary current values read into the computer—e.g., protective relaxing of connected feeders; nonfault indication of current magnitude to the local operator through the computer's display; calculation and transmission of current and power flow information to a remote system control center; and revenue metering.

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

For instance, in the digital computer embodiment, the method of floating $Ref_A$ to enhance the system's ability to distinguish external faults could easily be modified. $Ref_A$ could be made to track the peak of $I_{dif}$ either more closely or less closely by varying the method of decrementing $Ref_A$ in box 80 in FIG. 11. The $Ref_A$ adjustment method could be changed even more by making $Ref_A$ a function of the total current flowing into the power bus 20 rather than the differential current.

What is claimed is:

1. A power bus fault detector for detecting faults in a predefined portion of an electrical power bus having at least one phase, said predefined portion of said power bus consisting of the portion of an electrical power bus bounded by a preselected set of feed lines having connectors which controllably connect said feed lines to said power bus, said power bus fault detector comprising:

current transformer means for detecting the current flowing through at least one phase of each said power feed lines to said power bus;

summing means for generating a current differential signal for said at least one phase equal to the sum of said currents detected by said current transformer means;

fault detection means for generating a trip signal which causes said feed line connectors to disconnect said feed lines from said power bus when a fault is detected in said portion of said power bus, including means for detecting when said current differential signal is substantially nonsinusoidal in shape.

2. The power bus fault detector set forth in claim 1, wherein the shape of said current differential signal is determined by monitoring the percentage of time that said current differential signal exceeds a fault cutoff value.

3. The power bus fault detector set forth in claim 2, wherein said monitoring includes comparing said percentage of time with the percentage of time that the current differential signal for a known minimum fault exceeds said fault cutoff value.

4. The power bus fault detector set forth in claim 2, wherein said fault detection means includes means for detecting when the percentage of time that the magnitude of said current differential signal exceeds a fault cutoff value is greater than the percentage of time that said current differential signal exceeds said fault cutoff value for a known minimum fault.

5. The power bus fault detector set forth in claim 4, further including
fault cutoff generation means for generating a fault cutoff value which increases when said current differential value increases.

6. A power bus fault detector for detecting faults in a predefined portion of an electrical power bus having at least one phase, said predefined portion of said power bus consisting of the portion of an electrical power bus bounded by a preselected set of feed lines having connectors which controllably connect said feed lines to said power bus, said power bus fault detector comprising:
current transformer means for detecting the current flowing through at least one phase of said power feed lines to said power bus,
summing means for generating a current differential value for at least said one phase equal to the sum of said currents detected by said current transformer means;
integration means for generating an integration signal for each said phase that increases at a first predetermined rate when the magnitude of the corresponding current differential value exceeds a fault cutoff value and decreases at a second predetermined rate otherwise, said integration signal having a predefined minimum value below which it cannot be decreased, the ratio of said first and second predetermined rates having a value of at least 4 to 1; and
trip means for generating a trip signal which causes said feed line connectors to disconnect said feed lines from said power bus when said integration signal exceeds an alarm limit.

7. The power bus fault detector set forth in claim 6, further including
fault cutoff generation means for generating a fault cutoff value which increases when said current differential value increases.

8. The power bus fault detector set forth in claim 6, further including
fault cutoff generation means for generating a fault cutoff value which increases when said current differential value increases above a predefined minimum value.

9. The power bus fault detector set forth in claim 6, wherein
the ratio of said first and second predetermined rates has a value of approximately 15:1.

10. The power bus fault detector set forth in claim 6, wherein
said first predetermined rate has a value less than said fault cutoff value divided by the half the normal cycle time of the alternating electrical current carried by said power bus, so that a fault must persist on said predefined portion of said power bus for more than one half of said normal cycle time before said trip means will generate a trip signal.

11. The power bus fault detector set forth in claim 6, wherein
the ratio of said first predetermined rate has a value less than said fault cutoff value divided by the half the normal cycle time of the alternating electrical current carried by said power bus, so that a fault must persist on said predefined portion of said power bus for more than one half of said normal cycle time before said trip means will generate a trip signal; and
said power bus fault detector further includes:
fault cutoff generation means for generating a fault cutoff value which increases when said current differential value increases.

12. A power bus fault detector for detecting faults in a predefined protection zone of an electrical power bus consisting of the portion of an electrical power bus bounded by a preselected set of feed lines having connectors which controllably connect said feed lines to said power bus, comprising:
current transformer means for detecting the current flowing through at least one phase of said power feed lines to said power bus;
summing means for generating a current differential value for said at least one phase equal to the sum of said currents detected by said current transformer means;
digital processing means for periodically, at least four times per normal power cycle of the alternating electrical current carried by said power bus, comparing said current differential value with a fault cutoff value, and increasing an integration value by a first value if said current differential value exceeds said fault cutoff value and decreasing said integration value by a second value otherwise, said integration value having a predefined minimum value below which it cannot be decreased, the ratio of said first and second values having a value of at least four to one; and
trip means for generating a trip signal which causes said feed line connectors to disconnect said feed lines from said power bus when said integration value exceeds an alarm limit.

13. The power bus fault detector set forth in claim 12, further including
fault cutoff generation means for generating a fault cutoff value which increases when said current differential value increases.

14. The power bus fault detector set forth in claim 12, further including
fault cutoff generation means for generating a fault cutoff value which increases when said current differential value increases above a predefined minimum value.

15. A method of detecting faults in a predefined protection zone of an electrical power bus consisting of the portion of an electrical power bus bounded by a preselected set of feed lines having connectors which controllably connect said feed lines to said power bus, comprising:
providing current transformers for at least one phase of each said feed line to detect the current flowing through said at least one phase of each said power feed lines to said power bus, and generating a current differential signal for said at least one phase comprising the sum of the secondary current flowing through said current transformers; and
generating a trip signal which causes said feed line connectors to disconnect said feed lines from said power bus when said current differential signal is substantially nonsinusoidal in shape.

16. The power bus fault detection method set forth in claim 15, wherein the shape of said current differential signal is determined by monitoring the percentage of time that said current differential signal exceeds a fault cutoff value.

17. The power bus fault detection method set forth in claim 15, wherein said monitoring includes comparing said percentage of time with the percentage of time that the current differential signal for a known minimum fault exceeds said fault cutoff value.

18. The power bus fault detection method set forth in claim 16, wherein said step of generating a trip signal includes the step of detecting when the percentage of time that the magnitude of said current differential signal exceeds a fault cutoff value is greater than the percentage of time that said current differential signal exceeds said fault cutoff value for a known minimum fault.

19. The power bus fault detection method set forth in claim 18, further including the step of
generating a fault cutoff value which increases when said current differential value increases.

20. A method of detecting faults in a predefined protection zone of an electrical power bus consisting of the portion of an electrical power bus bounded by a preselected set of feed lines having connectors which controllably connect said feed lines to said power bus, comprising:
detecting the current flowing through at least one phase of said power feed lines to said power bus and generating a current differential value for said at least one phase comprising the sum of the currents flowing through the corresponding phase of said power feed lines;
for said at least one phase, generating an integration signal that increases at a first predetermined rate when the magnitude of the corresponding current differential value exceeds a fault cutoff value and decreases at a second predetermined rate otherwise, said integration signal having a predefined minimum value below which it cannot be decreased, the ratio of said first and second predetermined rates having a value of at least four to one;
generating a trip signal which causes said feed line connectors to disconnect said feed lines from said power bus when said integration signal exceeds an alarm limit.

21. The power bus fault detection method set forth in claim 20, further including the step of
generating a fault cutoff value which increases when said current differential value increases.

22. The power bus fault detection method set forth in claim 20, further including the step of
generating a fault cutoff value which increases when said current differential value increases above a predefined minimum value.

* * * * *